(12) United States Patent  (10) Patent No.: US 6,174,218 B1
Church et al.                (45) Date of Patent:      Jan. 16, 2001

(54) BOW COMPENSATED LAPPING

(75) Inventors: Mark Anthony Church, Los Gatos; Alain M. Desouches, Santa Cruz; Christopher Arcona, Campbell; George M. Moorefield, II, Morgan Hill, all of CA (US)

(73) Assignee: International Business Machines corporation, Armonk, NY (US)

( * ) Notice: Under 35 U.S.C. 154(b), the term of this patent shall be extended for 0 days.

(21) Appl. No.: 09/295,696

(22) Filed: Apr. 21, 1999

(51) Int. Cl.$^7$ ........................................... B24B 49/00
(52) U.S. Cl. .................... 451/5; 451/4; 451/364; 451/405
(58) Field of Search .................... 451/5, 11, 364, 451/405; 269/22, 266, 73, 264

(56) References Cited

U.S. PATENT DOCUMENTS

| | | |
|---|---|---|
| 4,457,114 | 7/1984 | Hennenfent et al. . |
| 4,914,868 | 4/1990 | Church et al. . |
| 5,117,589 | 6/1992 | Bischoff et al. . |
| 5,203,119 | 4/1993 | Cole . |
| 5,525,091 | 6/1996 | Lam et al. . |
| 5,607,340 | 3/1997 | Lackey et al. . |
| 5,620,356 | 4/1997 | Lackey et al. . |
| 5,624,298 * | 4/1997 | Yumoto ................................. 451/28 |
| 6,050,878 * | 4/2000 | Kanzo et al. ............................ 451/5 |
| 6,405,431 * | 4/2000 | Cheprasov et al. ..................... 451/5 |

* cited by examiner

Primary Examiner—David A. Scherbel
Assistant Examiner—George Nguyen
(74) Attorney, Agent, or Firm—Hickman, Coleman & Hughes, LLP

(57) ABSTRACT

A method and apparatus for controlling the amount of row distortion before and dynamically during the lapping process used to manufacture sliders for magnetic storage devices. A wafer quadrant of slider rows is bonded to an extender tool held in a carrier assembly and an actuator is used to laterally apply force to the extender tool such that it changes the profile of the wafer quadrant, and thus the foremost slider row. Multiple arms may be defined in the extender tool, permitting independent engagement with and application of the lateral force by the actuator. Bending moments in each arm are then efficiently and controllably transferred into a beam in the extender tool which is proximate to the point where the wafer quadrant is bonded.

14 Claims, 6 Drawing Sheets

BOW COMPENSATED LAPPING

BACKGROUND OF THE INVENTION

1. Field of the Invention

The present invention relates to an apparatus and method for the manufacture of sliders used in magnetic storage devices. More particularly, the invention relates to an improved system for controlling the amount of non-linear deformation in wafer quadrants of slider rows during lapping in manufacturing.

2. Description of the Background Art

Digital magnetic disk drives are one very widely used type of storage device today. Such drives employ head-mounted magnetic transducers to read and write data on rotating disk media. The operable portion of such a transducer head is called a "slider," and the key operational portion of a slider is a transducing gap between pole elements. It is the characteristics of this gap, which to a large degree, determine the performance of the slider, and ultimately its suitability for use in a disk drive.

Most dimensions of a slider's gap are dictated by the semiconductor-type fabrication processes used, and are therefore generally not a problem, since such processes can be very precise. A critical exception, however, is the depth of the gap, termed "stripe height" for magneto-resistive heads (the present discussion also may apply to inductive heads, where the usual term used is "throat height"). The stripe height is achieved by abrasively removing material in a lapping step during manufacturing.

Problems arise with regard to the stripe height because sliders are typically manufactured together in batches. A number of such rows of sliders are deposited together onto a single semiconductor-type wafer, which is then cut into pieces commonly termed "wafer quadrants" (or just "quadrants"). A wafer quadrant is bonded onto an extender tool (also sometimes known as a row tool, transfer tool, or support bar) and the foremost slider row is lapped as a unit on an abrasive surface, such as a plate coated with an appropriate slurry mix. The slider row is then cut from the wafer quadrant, so that lapping of a new foremost slider row may commence. The sliced off row of sliders is ready for additional manufacturing steps, dicing into individual sliders, and then the final steps which ultimately produce working disk drive heads.

Unfortunately, lapping of a slider row as a unit can produce variation in the various slider's stripe heights. For example, even if a slider row is perfectly linear, it needs to be lapped in true parallel against the lapping surface, or sliders at one end of the row will be lapped differently than those at the opposite end. This is commonly referred to as "balance," and it is a problem which the industry has long appreciated and has generally developed adequate methods to correct.

Of present interest is where the foremost slider row in a wafer quadrant is not linear. The stresses inherent in wafer material and in the operations of lapping and slicing can all produce varying degrees of concave, convex, and higher order curvatures. This non-linear deformation is commonly termed "row bow" (although the term "bow" is often an understatement of the actual non-linearity which may be present). If such non-linearity is not corrected before lapping, and preferably also dynamically during lapping, the individual sliders within a row will have different amounts of material lapped away, i.e. end with different stripe heights.

Various systems for the correction of such bow have been tried. U.S. Pat. No. 4,457,114 discloses a carrier having a support bar to which a slider row workpiece is bonded. The support bar is connected to a base portion of the carrier by a central stem portion and thermal expansion is used between opposite ends of the support bar and the base to control the shape of the support bar. To get a range in shape from convex to flat to concave, the support bar may be made to be convex when cool.

U.S. Pat No. 5,117,589 discloses a transfer tool having a longitudinal slot or chamber in which a piezoelectric actuator or screw is present to control the shape of the transfer tool. To get a range in shapes, this transfer tool may also be convex when the actuator is off.

U.S. Pat No. 5,203,119 discloses a transfer tool secured in a bow yoke holder. The transfer tool has a single central slot in which the end of a piston is captured. Upward movement of the piston causes the transfer tool to assume a convex shape, and downward action of the piston produces a concave shape.

U.S. Pat. No. 4,914,868 discloses a holder having an elongated longitudinal slot which defines a beam portion of the holder. An actuator applies pressure in the middle of the beam to deflect it in a manner producing a quadratic curvature. Separate actuators at either end of the holder are used to control balance.

U.S. Pat. No. 5,525,091 discloses a transfer tool which has an elongated longitudinal slot defining a beam. Actuators (of undefined nature, but implicitly electrically operated) are used to controllably press three pins against the beam such that the shape of a slider row bonded to the transfer tool is changed.

U.S. Pat. No. 5,607,340 discloses a row tool having a series of bend openings and stress relief openings. The openings are all disclosed as being generally quite proximate to the edge of the row tool to which a slider row is bonded. Related U.S. Pat. No. 5,620,356 by the same inventors discloses the system for operating this row tool. A pair of electromagnetic actuators are used to apply balance pressure and a set of three other electromagnetic actuators are used to apply rotational twist to the bend openings in the row tool. The noted structure and location of the openings dictates that the application of rotational twist is also proximate to the edge of the row tool where a slider row is bonded.

The last example presented above represents the most sophisticated prior art known to the inventors, but even it has severe limitations. Such limitations particularly include the intricate complexity of the row tool's shape, due to the number and placement of the openings, and the high difficulty of controlling all of the forces which must be applied together in concert to effect bow correction. Viewed as a vector sum, the use of rotational twist is effectively a simultaneous application of force in a direction normal to the lapping surface, along with lateral force. The normal forces applied from the three twist actuators can thus combine with the desired normal forces applied by the two balance actuators such that controlling the net forces throughout is quite difficult.

It is, therefore, an object of the present invention to provide an improved method, and apparatus for use of that method, for lapping sliders. Other objects and advantages will become apparent from the following disclosure.

SUMMARY OF THE INVENTION

The present invention relates to an apparatus and method for controlling the amount of row bow during lapping in the manufacture of sliders, and thus particularly controlling the stripe heights of individual sliders as material is lapped away. The method comprises: (i) bonding the wafer quadrant of slider rows onto an extender tool; (ii) mounting the extender tool in a carrier assembly; (iii) positioning the carrier assembly to bring the foremost slider row into contact with the lapping surface; and then compensating for non-linearity during lapping by: (iv) adjustably applying pressure to the carrier assembly; and (v) distorting the extender tool artificially with at least one force laterally applied to the extender tool such that it changes the profile of the foremost slider row in the wafer quadrant.

The apparatus is used to effectuate the method and includes: (i) an extender tool, to which the wafer quadrant of slider rows is bonded; (ii) a carrier assembly including a base and cover which are suitable for mounting and holding the extender tool bolted between them, wherein the carrier assembly is mountable in a generally conventional lapping system; and (iii) an actuator mechanism suitable for applying at least one lateral force to the extender tool as lapping operations commence and proceed.

A more thorough disclosure of the present invention is presented in the detailed description which follows and in the accompanying figures.

BRIEF DESCRIPTION OF THE DRAWINGS

The objects, advantages and features of the present invention will be more clearly understood by reference to the following detailed disclosure and the accompanying drawings in which.

DETAILED DESCRIPTION OF THE INVENTION

Figure 1:
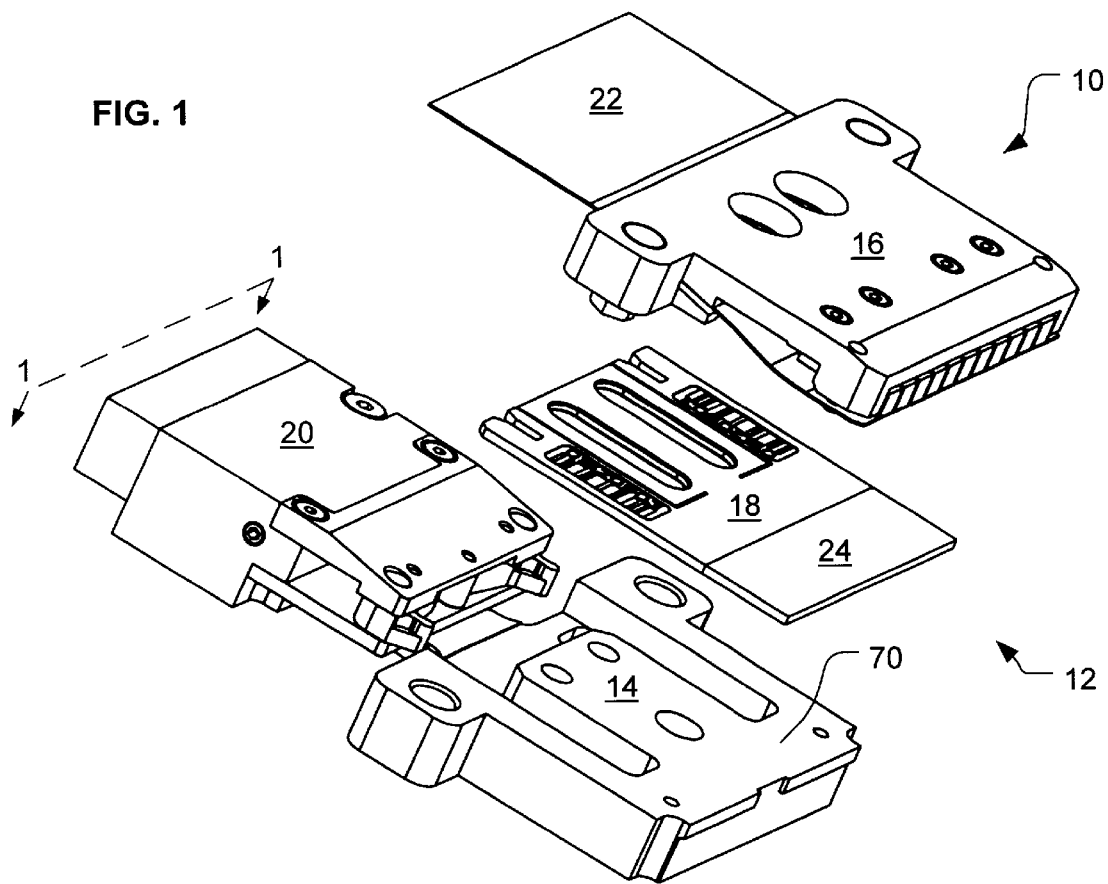
FIG. 1 is a partially exploded view depicting the major elements of the invention.

The present invention relates to an improved apparatus and method for bow compensation during the manufacture of sliders. As illustrated in the various drawings herein, and particularly in the view of FIG. 1, a preferred embodiment of the inventive apparatus is depicted by the general reference character 10.

FIG. 1 depicts key elements of the inventive lapping tool 10 in a partially exploded view. Therein is shown a carrier assembly 12 having a carrier base 14, a carrier cover 16, and an extender tool 18. In this view, the carrier base 14 has an actuator 20 already mounted onto it, the carrier cover 16 has a probe assembly 22 already mounted into it, and the extender tool 18 has a wafer quadrant 24 bonded to it. The wafer quadrant 24 is a "quad" of slider rows which constitute the workpiece upon which lapping is to occur, e.g., a block of thirty slider rows with forty-four MR type sliders in each. Other than the carrier assembly 12, the lapping tool 10 may be generally conventional in nature and such portions are therefore not shown.

Figure 2:
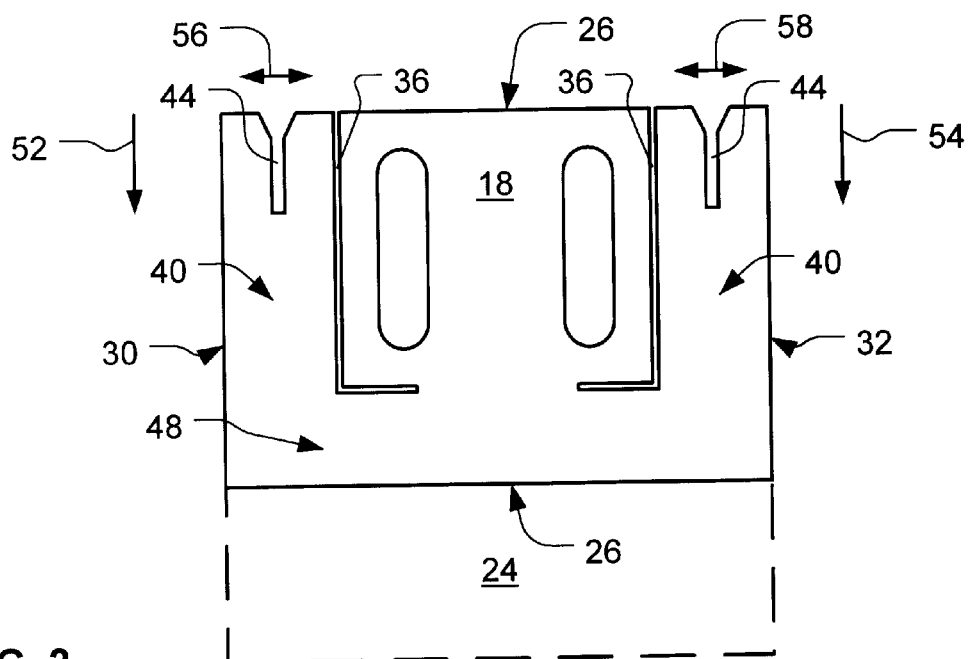
FIG. 2 is a plan view of the extender tool portion of the invention with a wafer quadrant workpiece bonded to it.

FIG. 2 depicts the extender tool 18 in plan view with a bonded wafer quadrant 24 (shown in ghost outline). With reference to the orientation used in FIG. 2 the edges may be termed: an actuated edge 26, which in lapping may also be thought of as upward or backward most; a bonding edge 28, which is bottom or forward during lapping; a left edge 30; and also a right edge 32. At the lowest end of the wafer quadrant 24 is a working edge 34, so termed because it constitutes the surface of the foremost slider row which is to be lapped.

A first L-slot 36 is provided toward the left edge 30 of the extender tool 18 and a second such L-slot 36 (reverse L-shaped) is provided toward the right edge 32. The use of an L-shape is currently preferred by the inventors, but is not a limitation. The regions between the left edge 30 and right edge 32 and the respective L-slots 36 define extender arms 40. Each such extender arm 40 includes an arm slot 44, toward the actuated edge 26. The region between the bonding edge 28 and the bottoms of both of the L-slots 36 forms a beam 48.

FIG. 2 also portrays the primary forces which may be intentionally applied to the extender tool 18. A left balance force 52 and a right balance force 54 are each depicted by single-arrowed vertical lines. A potentially bi-directional left side lateral force 56 and a similar bi-directional right side lateral force 58 are depicted by dual-arrowed horizontal lines.

The balance forces 52, 54 are typically provided by the apparatus holding the carrier assembly 12, by pistons which bear down on it. This is largely the conventional manner used today with existing carrier assemblies and extender tools, although single and triple piston and balance force systems are also known.

In contrast, a novel departure from conventional technique here is the use of the lateral forces 56, 58. A left or right lateral application of force to either of the arm slots 44 causes a bending moment to be transferred from the respective extender arm 40 into the beam 48. The present invention makes controlled use of all of these forces 52, 54, 56, 58 in concert to correct for distortion at the working edge 34 of the wafer quadrant 24, i.e., in the foremost slider row.

Figure 3:
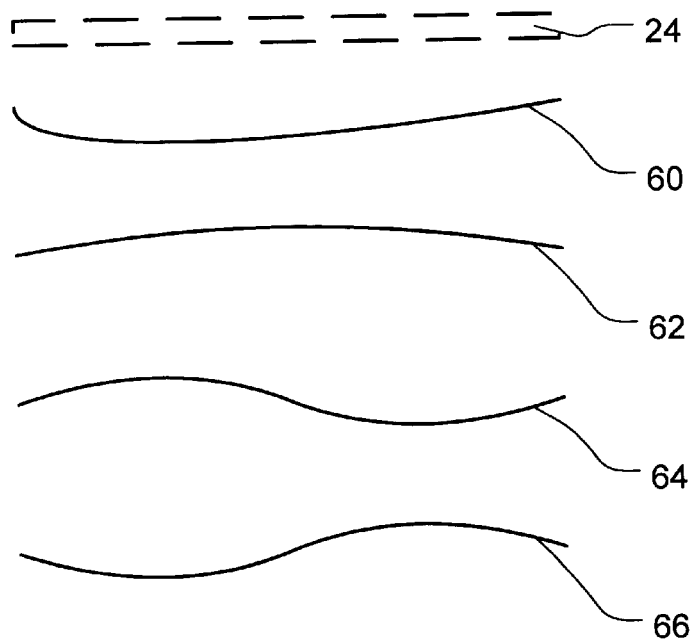
FIG. 3 is a graphical depiction of four particular forms of row bow distortion which the invention can be used to correct.

FIG. 3 is a graphical depiction of four particular forms of row distortion which the invention can be used to substantially reduce or eliminate. The working edge 34 of the wafer quadrant 24 is shown here merely as a graph line. Positive quadratic distortion, or convex row bow, is represented by line 60 and negative quadratic distortion, or concave row bow, is represented by line 62. Represented by line 64 and line 66 are two opposite states of higher frequency waveform distortion commonly referred to as "S" shape row bow. In FIG. 3, line 60 is intentionally depicted as an asymmetrical convex distortion to emphasize that even such non-linearities (which are more than mere simple bow) may occur and be corrected using the inventive lapping tool 10.

Correcting for these types of distortion is particularly difficult because of the need to integrate the compensation state, the magnitude of compensation, and the balance. The net mechanical actions are often in the same direction, downward, and thus in competition with each other. In the present invention, the balance forces 52, 54 and the lateral forces 56, 58 must still be dealt with simultaneously, but they are applied separately, in purely normal and purely lateral directions initially, and this simplifies control of their application.

Figure 4:
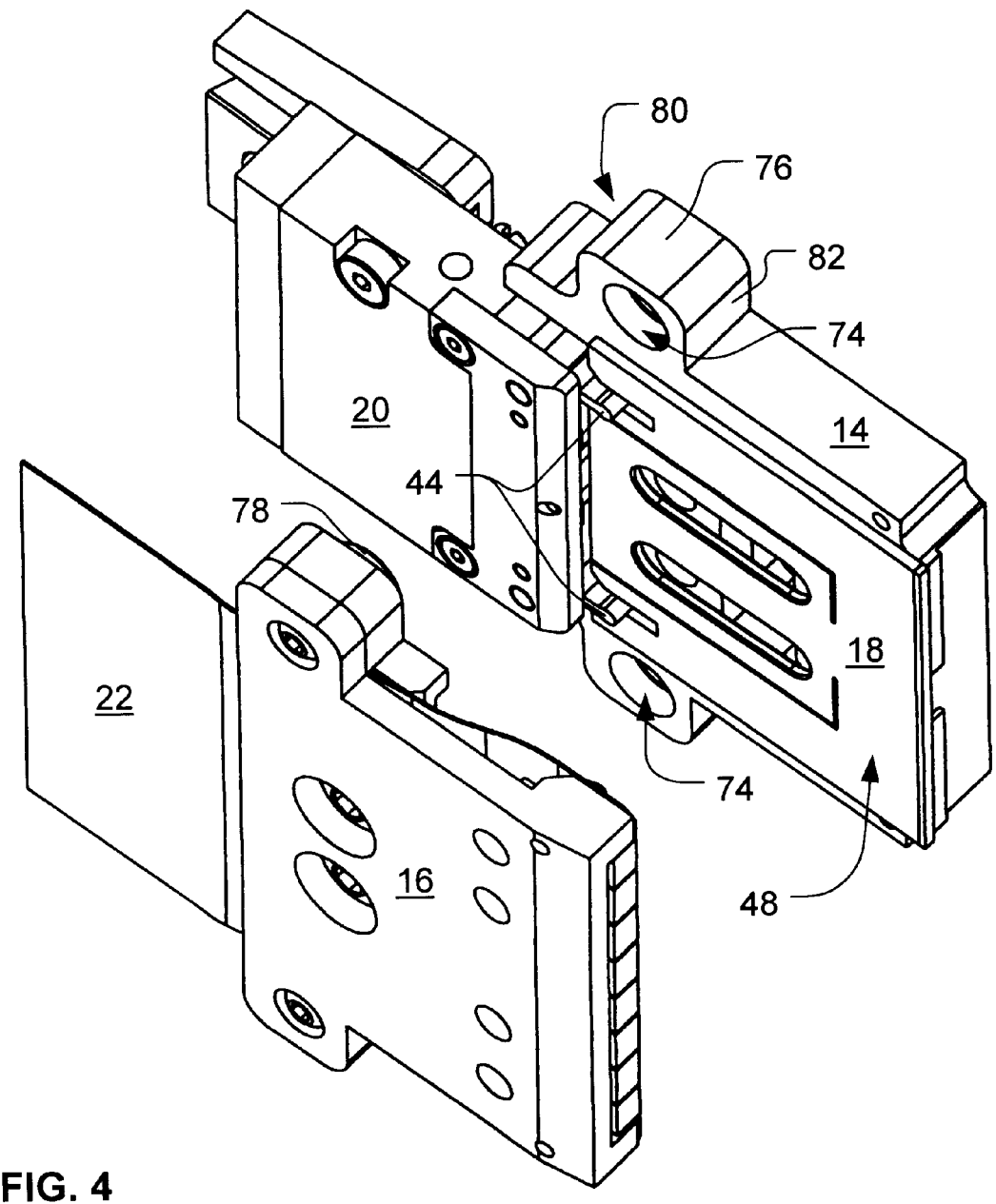
FIG. 4 is a partially exploded view of the carrier cover of the invention removed from a carrier base and actuator with a mounted extender tool.

FIG. 4 is a partially exploded view showing the extender tool 18 mounted on the carrier base 14 and engaged with the actuator 20 before the carrier cover 16 has been mounted and bolts (not shown) used to secure all together. An actuator arm 72 extending from each side of the actuator 20 engages each of the arm slots 44 in the extender tool 18. When suitably engaged in this manner, the lateral forces 56, 58 are transferred into the arm slots 44 and onward to the beam 48 and any bonded wafer quadrant 24.

In FIG. 4 the wafer quadrant 24 which is bonded to the extender tool 18 is shown as smaller than that in FIG. 1, depicting that a number of slider rows have already been lapped and removed from it. It should be appreciated that as individual slider rows are removed, the extender tool 18 is brought forward almost the entire length of the wafer quadrant 24 along a receiving surface 70 (FIG. 1) on the carrier base 14. Since the extender tool 18 is bolted against the receiving surface 70, in the preferred embodiment, it has been one of the inventors' particular observations that the receiving surface 70 needs be particularly flat for this purpose, as well as for stabilizing the extender tool 18 and its bonded wafer quadrant 24 for consistent operation of the probe assembly 22 (discussed presently).

To mate the carrier base 14 to the carrier cover 16 in precise relationship a peg-in-hole system is used. The carrier base 14 includes holes 74 in side members 76 which are engaged by pegs 78 (see also FIG. 5) in the carrier cover 16.

In the preferred embodiment the side members 76 each also have appropriate top surfaces 80 to receive downward pressure from balance pistons (not shown) and bottom surfaces 82 to receive upward pressure from retracting springs (not shown; also sometimes called ejecting springs in the industry). As has previously been noted, such pistons and springs are conventional parts of the overall lapping apparatus used.

Figure 5:
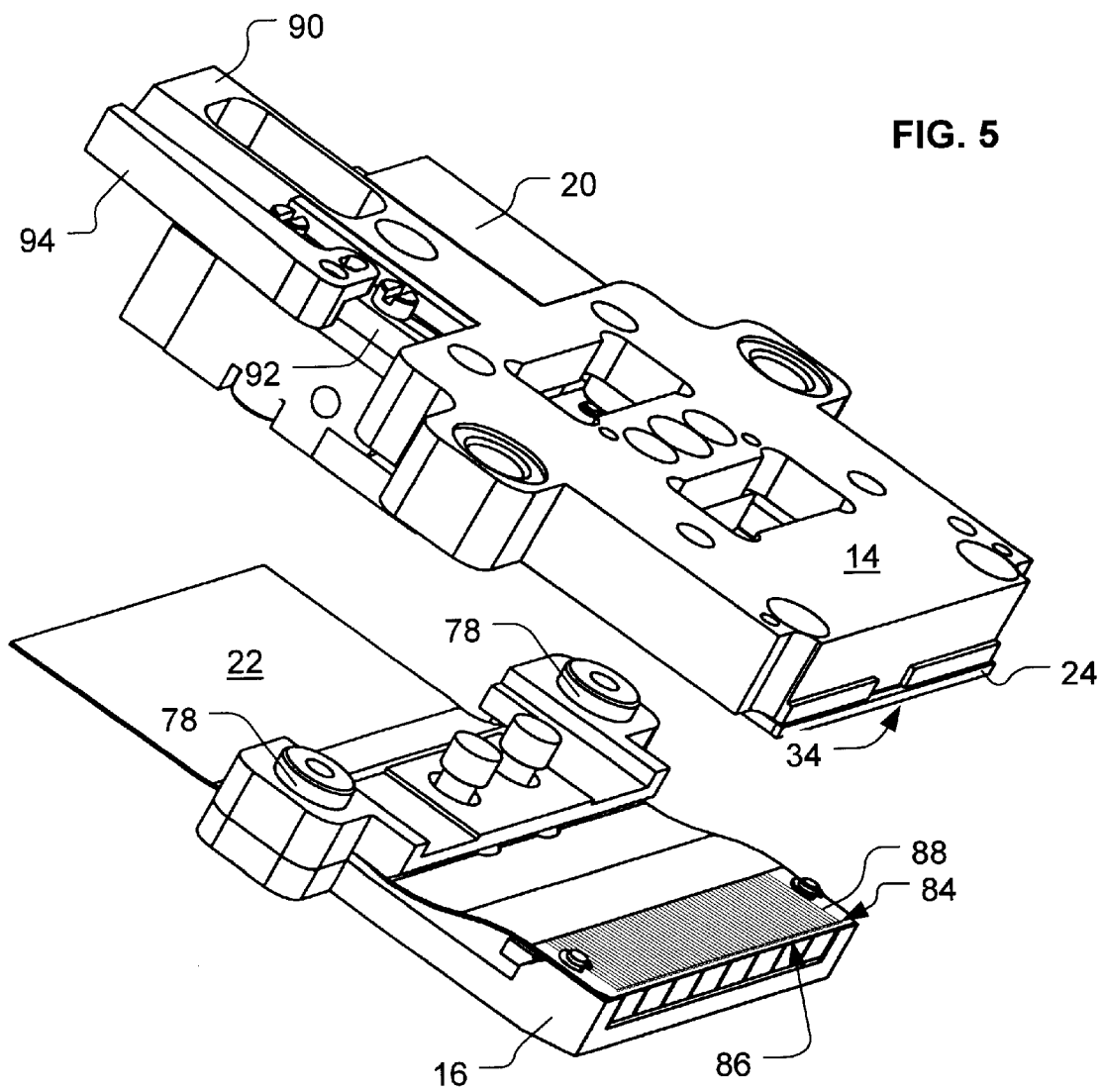
FIG. 5 is a rotated version of the view presented in FIG. 4, better showing other features of the invention.

FIG. 5 is a rotated view of FIG. 4, better showing other features of the invention. The probe assembly 22 is a film cable having at its bottom edge 86 a series of probe pads 84 which are each connected with electrical conductors 88 that go back to a lapping system control system. The probe pads 84 are conductive surfaces which respectively engage with conventional slider row electronic lapping guide (ELG) contacts. Such ELG contacts are typically provided in each slider row, including those in the foremost row, which will be present at the working edge 34 of the wafer quadrant 24.

This view also illustrates how the actuator 20 is slidably mounted to the rest of the carrier assembly 12. The carrier base 14 includes a dovetail rail 90 and the actuator 20 includes a suitable pinch mechanism 92 to engage the dovetail. The pinch mechanism 92 is operated by a lever 94 to compressably lock the actuator 20 onto place on the rail 90.

Figure 6:
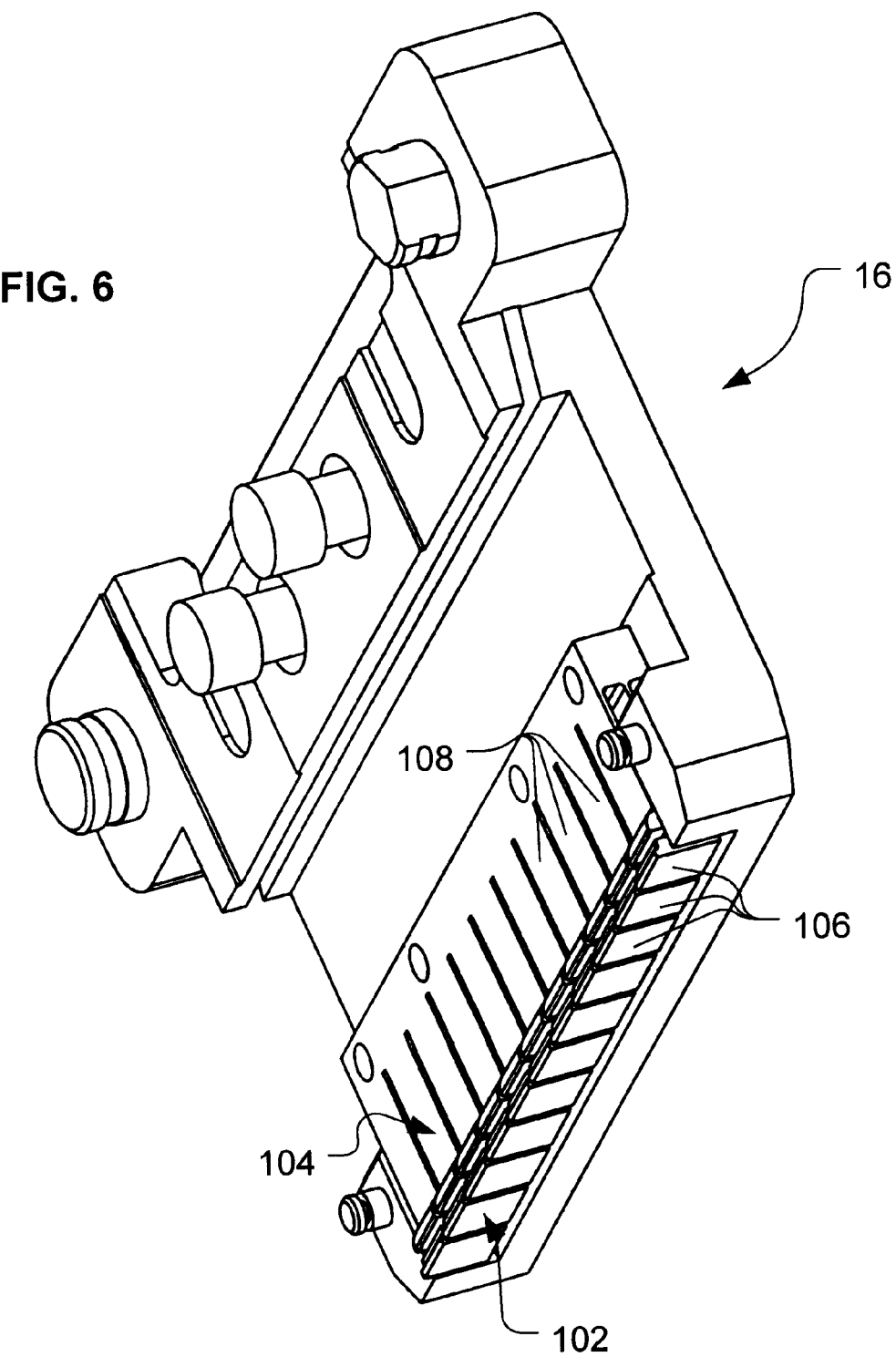
FIG. 6 is a perspective view of the carrier cover portion of the invention without the probe assembly installed.

FIG. 6 depicts the carrier cover 16 without the probe assembly 22 installed. As can be particularly appreciated in this view, the carrier cover 16 includes a probe clamp spring 102 and a quad clamp spring 104. The probe clamp spring 102 has a plurality of fingers 106 which are provided in sufficient number and which are suitably positioned to tend to force the probe pads 84 (FIG. 5) into electrical contact with all of the ELG contacts of the foremost slider row. The quad clamp spring 104 also has a plurality of fingers 108 (not necessarily the same in number as those of the probe clamp spring 102) which apply force through the flexible medium of the probe assembly 22 and against the wafer quadrant 24. This force holds the bonded extender tool 18 and wafer quadrant 24 against the receiving surface 70 of the carrier base 14 (FIG. 1).

The inventors have particularly observed that the design and use of the probe clamp spring 102 and the quad clamp spring 104 are important. The pressure applied by the probe clamp spring 102 needs to be just sufficient that adequate electrical contact is made with the ELG contacts. Despite the seeming stiffness of the material of the wafer quadrant 24, even very minor pressure on the wafer quadrant 24 may be manifested as deformation which can adversely affect lapping. The pressure applied by the quad clamp spring 104 also needs to be just sufficient that the wafer quadrant 24 is pressed against the receiving surface 70 of the carrier base 14 (through the flexible cable of the probe assembly 22). Excessive pressure by the quad clamp spring 104 can interfere with reliable operation of the probe clamp spring 102 and the ELG contacts, as well as contributing to undesirable deformation at the working edge 34 of the wafer quadrant 24. Accordingly, any undue spring pressure is undesirable.

Figure 7:
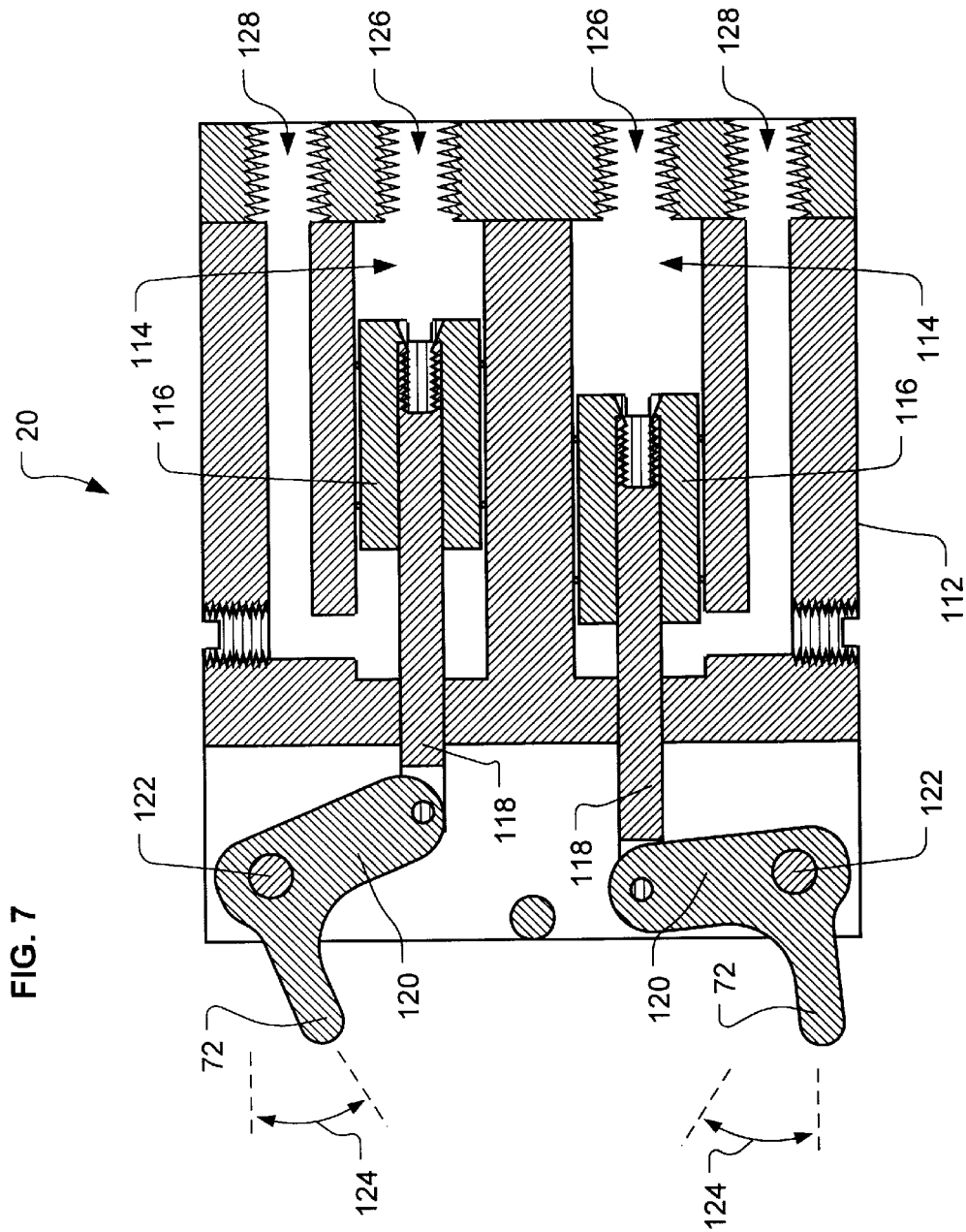
FIG. 7 is a cross section view of the actuator portion of the invention, taken along axis 1—1 of FIG. 1.

FIG. 7 is a cut away view of the actuator 20, as taken through section 1-1 of FIG. 1. The actuator 20 has an actuator body 112 that includes two piston chambers 114. These each house an actuator piston 116 which has a forward extending piston rod 118. The piston rods 118 each pivotally connect to an arm body 120 that is itself pivotally mounted on pivot pins 122 which are fixed in the actuator body 112. Each actuator arm 72 may then independently exhibit pivotal movement, depicted by arcs 124, when an associated actuator piston 116 and piston rod 118 are moved forward or backward.

For pneumatic operation, access to each piston chamber 114 is provided by a positive pressure port 126 and a negative pressure port 128. When a net pressure is applied which is greater at a positive pressure port 126 than it is at an associated negative pressure port 128, the actuator piston 116 in the associated piston chamber 114 is moved forward and the associated actuator arm 72 is forced toward the outside. Conversely, when the net pressure is greatest at a negative pressure port 128, the associated actuator arm 72 is forced inward.

Many other suitable means, beside pneumatic piston operation, may be used for moving the actuator arms 72, and the method described above for this discussion should not be interpreted as restricting the true scope of the present invention. Some other examples, without limitation, include pneumatically operated bellows, hydraulically operated pistons or bellows, piezoelectric positioners, electromagnetic positioners, and thermal expansion positioners.

With particular reference now to FIG. 2 and FIG. 3, the preferred embodiment can be used to compensate for row bow as follows. First, a new wafer quadrant 24 is bonded to the extender tool 18 and this assembly is mounted in the carrier assembly 12, creating the inventive lapping tool 10 for use in an otherwise generally common lapping system (not shown). For purposes of this example, assume that the un-compensated new wafer quadrant 24 has the quadratic curvature depicted by line 64 in FIG. 3. As lapping commences at the working edge 34 of the wafer quadrant 24, the controller in the lapping system monitors the ELGs for the foremost slider row as lapping away of some wafer material occurs, and is then able to determine that the quadratic curvature of line 64 is in fact present.

If compensation is not undertaken, many sliders in the left half of the slider row in this scenario are about to be under lapped, i.e., end up with excessive stripe height, and many sliders in the right half of the slider row are about to be over lapped, i.e., end up with less than optimal stripe height.

Accordingly, the controller will attempt to direct compensation of the distortion present in a manner to achieve the highest yield and quality of sliders in the current foremost row. Up to this point, the method employed has been essentially a conventional one used in the industry.

However, using the inventive lapping tool 10, the controller of the underlying lapping system is now able to more efficiently and effectively compensate for the non-linear distortion condition than would be the case using conventional lapping tools. In response to the condition in the left half of the working edge 34, the controller directs appropriate pneumatic pressure to the pressure ports 126, 128 (FIG. 7) of the actuator 20, causing the actuator piston 116 in that side to pivot the associated actuator arm 72 rightward. Due to the engagement of the actuator arm 72 in the arm slot 44 of the extender tool 18, the left side extender arm 40 is forced rightward, and acts as a lever to bend the left half of the beam 48. This produces a flattening in the left half of the working edge 34.

In this example, based on line 64 in FIG. 3, the condition opposite that above must be compensated for in the right half of the working edge 34. Therefore, the right side components of the actuator 20 and the extender tool 18 are simply used in an opposite manner, and the right half of the working edge 34 is flattened.

Addressing the other possible examples which FIG. 3 suggests should now be clear. Reversing all of the steps above will correct for quadratic curvature like that of line 66. Forcing the extender arms 40 both outward will bend the beam 48 in a manner that corrects for the convex bow of line 60 and forcing both extender arms 40 inward corrects for the concave bow of line 62.

Finally, the controller can actively continue monitoring the ELGs as lapping progresses, and dynamically apply appropriate pneumatic pressure to the pressure ports 126, 128 to compensate for slider row bow so that consistent and desired throat or stripe heights are obtained.

Although this invention has been described with respect to specific embodiments, the details thereof are not to be construed as limitations, for it will be apparent that various embodiments, changes and modifications may be resorted to without departing from the spirit and scope thereof; and it is understood that such equivalent embodiments are intended to be included within the scope of this invention.

What is claimed is:

1. An apparatus for holding a wafer quadrant of slider rows during lapping of a foremost row against a lapping surface, the apparatus comprising:
   an extender tool, to which the wafer quadrant is bonded;
   a carrier assembly having a carrier base and a carrier cover, said carrier assembly suitable for mounting and retaining said extender tool therewithin; and
   an actuator suitable for applying lateral force to said extender tool and thereby controlling non-linearity in the foremost row as lapping commences and proceeds.

2. The apparatus of claim 1, wherein:
   said extender tool has defined a left edge and a right edge;
   said extender tool further has defined a bonding edge, to which the wafer quadrant is bonded and an actuated edge opposite said bonding edge;
   said extender tool has a left isolating slot extending into said extender tool from said actuated edge and proximate to said left edge such that a left arm is defined;
   said extender tool has a right isolating slot extending into said extender tool from said actuated edge and proximate to said right edge such that a right arm is defined; and
   said extender tool further includes a beam portion located toward said bonding edge and extending between said left edge and said right edge; wherein
   said lateral force is selectively applied to at least one of said left arm and said right arm of the extender tool such that lateral deflection of at least one of said left arm and said right arm occurs and a bending moment is applied to the beam portion of said extender tool, thereby particularly controlling non-linearity in the foremost row.

3. The apparatus of claim 2, wherein:
   said left arm has a left actuating slot extending inward from said actuating edge;
   said right arm includes a right actuating slot extending inward from said actuating edge; and
   said left actuating slot and said right actuating slot are suitable for engagement with said actuator and receiving application of said lateral force such that controllable deflection of each of said left arm and said right arm of said extender tool is obtainable in both leftward and rightward directions.

4. The apparatus of claim 3, wherein:
   said left isolating slot is L-shaped and said right isolating slot is reverse L-shaped, for particularly controlling said bending moment which is applied to the beam.

5. The apparatus of claim 2, wherein:
   said actuator includes a left actuator arm suitable for applying a portion of said lateral force to said left arm and a right actuator arm suitable for applying a portion of said lateral force to said right arm of said extender tool.

6. The apparatus of claim 3, wherein:
   said lateral force includes a left side portion and a right side portion; and
   said actuator includes a left actuator arm suitable for applying said left side portion of said lateral force to said left actuating slot and a right actuator arm suitable for applying said right side portion of said lateral force to said right actuating slot of said extender tool.

7. The apparatus of claim 1, wherein:
   said carrier base has defined a left side and a right side; and
   said carrier base includes a first side member on said left side which is suitable for selective application of a left balance force and a second side member on said right side which is suitable for selective application of a right balance force to said carrier assembly while the foremost row is against the lapping surface.

8. An apparatus for holding a wafer quadrant of slider rows during lapping of a foremost row against a lapping surface, the apparatus comprising:
   an extender tool, to which the wafer quadrant is bonded;
   carrier means for mounting and retaining said extender tool therewithin; and
   actuator means for applying lateral force to said extender tool and thereby controlling non-linearity in the foremost row as lapping commences and proceeds.

9. The apparatus of claim 8, wherein:
   said extender tool has defined a left edge and a right edge;
   said extender tool further has defined a bonding edge, to which the wafer quadrant is bonded and an actuated edge opposite said bonding edge;
   said extender tool has a left isolating slot extending into said extender tool from said actuated edge and proximate to said left edge such that a left arm is defined;

said extender tool has a right isolating slot extending into said extender tool from said actuated edge and proximate to said right edge such that a right arm is defined; and said extender tool further includes a beam portion located toward said bonding edge and extending between said left edge and said right edge; wherein said actuator means applies said lateral force selectively to at least one of said left arm and said right arm of the extender tool such that lateral deflection of at least one of said left arm and said right arm occurs and a bending moment is applied to the beam portion of said extender tool, thereby particularly controlling non-linearity in the foremost row.

10. The apparatus of claim 9, wherein:

said left arm has a left actuating slot extending inward from said actuating edge;

said right arm includes a right actuating slot extending inward from said actuating edge; and said left actuating slot and said right actuating slot are suitable for engagement with said actuator and receiving application of said lateral force such that controllable deflection of each of said left arm and said right arm of said extender tool is obtainable in both leftward and rightward directions.

11. The apparatus of claim 10, wherein:

said left isolating slot is L-shaped and said right isolating slot is reverse L-shaped, for particularly controlling said bending moment which is applied to the beam.

12. The apparatus of claim 9, wherein:

said actuator means includes a left actuating means for applying a portion of said lateral force to said left arm and a right actuating means for applying a portion of said lateral force to said right arm of said extender tool.

13. The apparatus of claim 10, wherein:

said lateral force includes a left side portion and a right side portion; and said actuator means includes a left actuating means for applying said left side portion of said lateral force to said left actuating slot and a right actuating means for applying said right side portion of said lateral force to said right actuating slot of said extender tool.

14. The apparatus of claim 8, wherein:

said carrier means has defined a left side and a right side; and said carrier means includes a first side member on said left side which is suitable for selective application of a left balance force and a second side member on said right side which is suitable for selective application of a right balance force to said carrier means while the foremost row is against the lapping surface.

* * * * *